United States Patent
Alderson

(10) Patent No.: US 7,518,661 B2
(45) Date of Patent: Apr. 14, 2009

(54) SYSTEM AND METHOD OF AUDIO DETECTION

(75) Inventor: Jeffrey Donald Alderson, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 644 days.

(21) Appl. No.: 11/240,332

(22) Filed: Sep. 30, 2005

(65) Prior Publication Data

US 2007/0091210 A1    Apr. 26, 2007

(51) Int. Cl.
*H04N 5/60* (2006.01)
*H04N 5/46* (2006.01)

(52) U.S. Cl. .................. 348/738; 348/462; 348/558

(58) Field of Classification Search .......... 348/738, 348/462, 465, 558, 725, 604; 381/22, 23, 381/2, 119; H04N 5/60, 7/00, 5/46, 5/44
See application file for complete search history.

(56) References Cited

U.S. PATENT DOCUMENTS

| | | | |
|---|---|---|---|
| 4,727,333 A | 2/1988 | Dieterich | |
| 5,220,602 A | 6/1993 | Robbins et al. | |
| 5,787,334 A | 7/1998 | Fardeau et al. | |
| 6,147,713 A | 11/2000 | Robbins et al. | |
| 6,359,944 B1 | 3/2002 | Curtis, III et al. | |
| 6,476,878 B1 | 11/2002 | Lafay et al. | |
| 2001/0050926 A1 | 12/2001 | Kumar | |
| 2004/0223553 A1 | 11/2004 | Kumar | |
| 2005/0036074 A1 | 2/2005 | Nhu | |

OTHER PUBLICATIONS

International Search Report and Written Opinion of the International Searching Authority, for International Application No. PCT/US06/29710, mailed Mar. 29, 2007.

*Primary Examiner*—Sherrie Hsia
(74) *Attorney, Agent, or Firm*—Toler Law Group

(57) ABSTRACT

A system and method for detecting a mode of an audio signal is disclosed. The system includes an integrated circuit with an input to receive a signal and an audio processor coupled to the input. The audio processor includes an audio standard detection module, wherein the audio standard detection module detects a characteristic of the received signal that identifies a television audio standard by measuring the energy level of a plurality of different frequency bands of the received signal.

28 Claims, 7 Drawing Sheets

SYSTEM AND METHOD OF AUDIO DETECTION

FIELD OF THE DISCLOSURE

The present disclosure is generally related to audio receivers for use in television systems.

BACKGROUND

Televisions are used throughout the world. Different regions of the world employ different audio and video standards for broadcasting television programs. For example, some regions use the Broadcast Television Systems Committee (BTSC) audio standard, while other regions use the EIA/J audio standard. In order to properly present a program to a viewer, a television decodes a broadcast signal according to the audio and video standard used in the associated region. For television manufacturers, it is beneficial if a television is capable of receiving and decoding broadcast signals according to a variety of different standards.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

A system and method for detecting a standard of an audio signal is disclosed. The system includes an integrated circuit with an input to receive a signal and an audio processor coupled to the input. The audio processor includes an audio processor coupled to the input and including a audio standard detection module, wherein the audio standard detection module detects a characteristic of the received signal that identifies a television audio standard by measuring the energy level of a plurality of different frequency bands of the received signal.

The method includes multiplying an inter-carrier signal with a first set of functions to produce a first and a second frequency shifted signal, filtering the first and the second frequency shifted signals to produce first and second filtered signals, integrating the absolute value of each of the first and second filtered signals to produce first and second integrated signals, and measuring and storing an energy level of each of the first and the second integrated signals. The method further includes multiplying the inter-carrier signal with a second set of functions to produce a third and a fourth frequency shifted signal, filtering the third and the fourth frequency shifted signals to produce third and fourth filtered signals, integrating the absolute value of each of the third and the fourth filtered signals to produce third and fourth integrated signals, and measuring and storing an energy level of each of the third and the fourth integrated signals. The method also includes determining the audio signal standard based on an evaluation of the stored energy levels.

Figure 1:
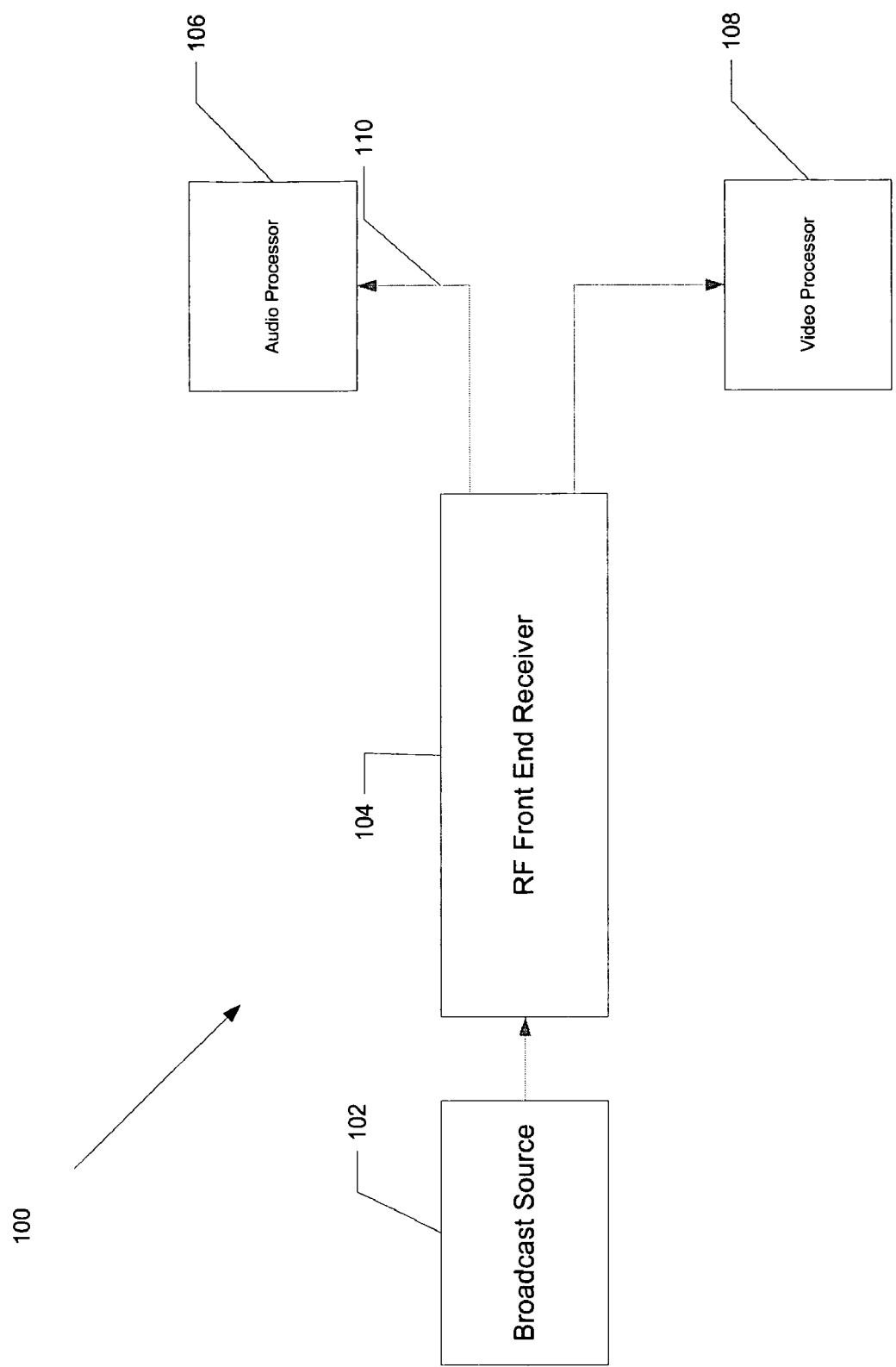
FIG. 1 is a block diagram of an exemplary embodiment of a television receiver system.

Referring to FIG. 1, an audio receiver system 100 is shown. The audio receiver system 100 includes a broadcast source 102, a radio frequency (RF) front end receiver 104, an audio processor 106, and a video processor 108. The RF front end receiver 104 is responsive to the broadcast source 102. The audio processor 106 receives an audio inter-carrier signal 110 from the RF front end receiver 104. In a particular embodiment, audio inter-carrier signal 110 is a second intermediate frequency (SIF) audio signal. The video processor 108 is also coupled to the RF front end receiver 104.

During operation, the broadcast source 102 provides a broadcast signal to the RF front end receiver 104. In a particular embodiment, the broadcast source 102 is a television broadcast source such as a broadcast antenna, cable, satellite, or other broadcast source. The RF front end receiver 104 processes the signal received from the broadcast source 102. In a particular embodiment, the RF front end receiver 104 splits the signal received from the broadcast source 102 into an audio inter-carrier 110 and a video signal. The video signal is provided to the video processor 108. The audio inter-carrier signal 110 is provided to the audio processor 106.

The audio inter-carrier signal 110 contains audio information related to a received television channel. The audio inter-carrier signal 110 may include audio that complies with one of several television audio standards. The audio processor 106 may detect the particular audio standard employed by the audio inter-carrier signal 110. After detecting the proper audio standard, the audio processor 106 may then further process the audio inter-carrier signal 110 so that the audio signal may be communicated over a television speaker or other device. In a particular embodiment, the audio processor 106 may demodulate the audio inter-carrier signal 110 after the audio standard has been detected.

Figure 2:
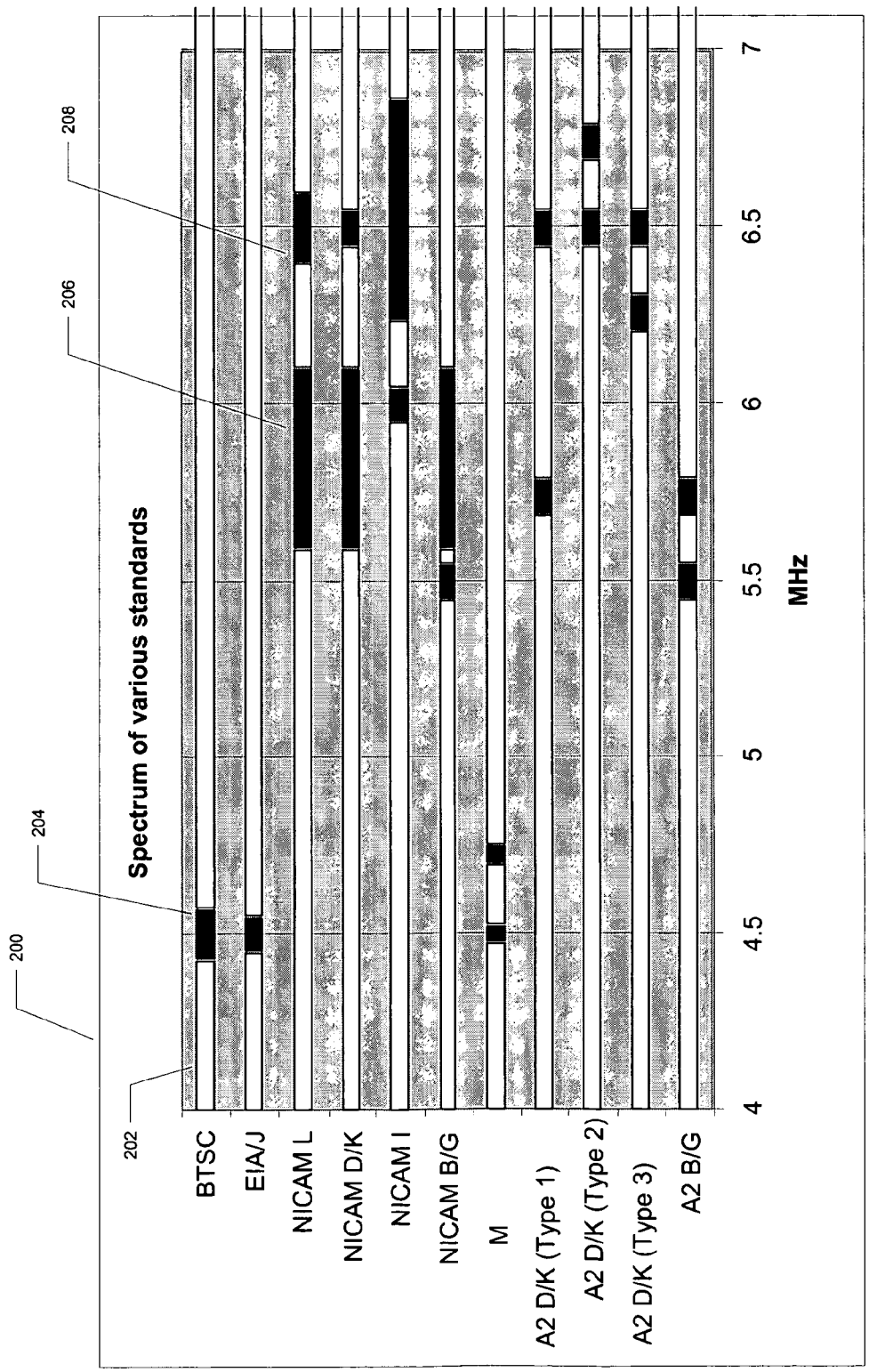
FIG. 2 is a chart of exemplary frequency bands associated with different television audio standards.

Referring to FIG. 2, a spectrum of various television audio standards 200 is shown. A variety of different audio standards, such as Broadcast Television Systems Committee (BTSC) audio standard 202 is shown. Each television audio standard includes audio information provided at a particular frequency band. For example, the BTSC standard 202 provides audio information at the frequency band 204. As illustrated the frequency band 204 is centered around 4.5 MHz. Other audio standards may employ multiple frequency bands to provide audio information. For example the NICAM L standard includes a first frequency band 206, centered around 5.7 MHz and a second frequency band 208 centered around 6.5 Mhz.

The frequency bands illustrated in FIG. 2 may be used to detect the audio standard of an audio signal. An audio processor may analyze the energy of an audio signal at the frequency bands associated with each audio standard. The audio processor may successively determine the energy associated with each frequency band illustrated in FIG. 2. By determining the frequency bands of the audio signal that include the most energy, the audio processor may identify an audio standard associated with the audio signal. For example, if the audio processor determines that, with respect to a particular audio signal, the two frequency bands centered around 5.7 MHz and 6.5 Mhz contain more energy than other frequency bands, the audio processor may determine that the audio signal complies with the NICAM L audio standard.

In addition, some of the audio standards are associated with similar frequency information. For example, the NICAM L and NICAM D/K standards are associated with the frequency bands centered around 5.7 MHz and centered around 6.5 Mhz. Accordingly, the audio processor may perform additional analysis to identify the correct audio standard for the audio signal.

Figure 3:
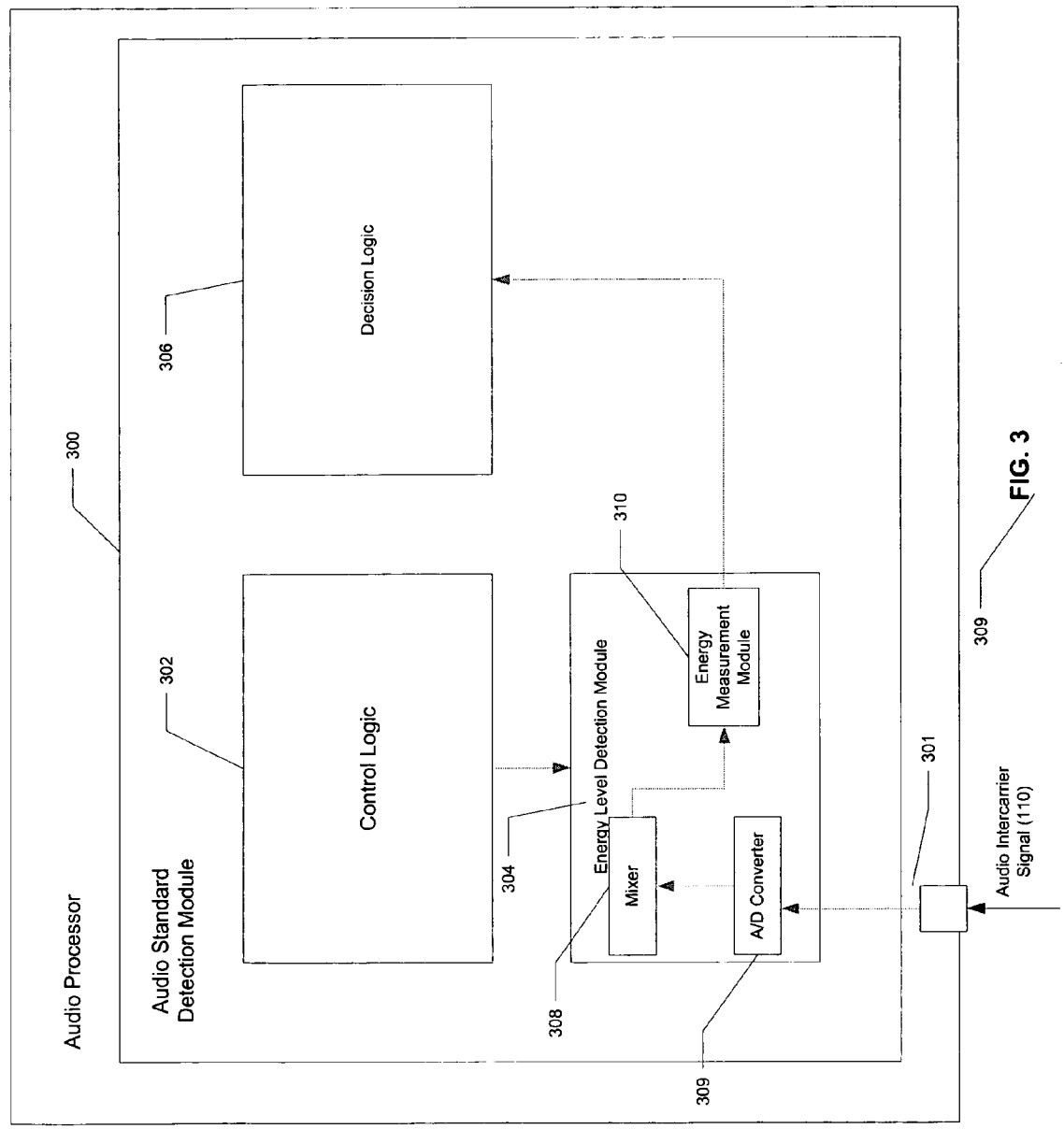
FIG. 3 is a block diagram of an illustrative embodiment of portions of an audio processor that may be used in the television receiver system of FIG. 1.

Referring to FIG. 3, an exemplary embodiment of an integrated circuit including an audio processor 106, such as the audio processor 106 illustrated in FIG. 1, is shown. The integrated circuit includes an input 301 and an audio standard detection module 300. The audio standard detection module 300 includes control logic 302 and an energy level detection module 304. The audio standard detection module also includes decision logic 306. The energy level detection module 304 includes a mixer 308, an analog to digital converter 309, and an energy measurement module 310. The energy level detection module receives an audio inter-carrier signal such as the audio inter-carrier signal 110. The energy level detection module 304 is responsive to the control logic 302. The decision logic 306 is coupled to the energy level detection module 304 and the decision logic 306 receives an output from the energy measurement module 310.

During operation the audio standard detection module 300 receives the audio inter-carrier signal 110 and detects an audio standard, such as one of the television audio standards illustrated in FIG. 2, associated with the audio inter-carrier signal 110 by measuring the energy level of different frequency bands of the received signal. In a particular embodiment, the audio inter-carrier signal 110 is derived from a signal received via a television tuner.

In a particular embodiment, the audio standard detection module 300 has a first mode of operation and a second mode of operation. In a first mode of operation the audio standard detection module detects the television audio standard of the audio inter-carrier signal 110, and in the second mode of operation particular components of the audio standard detection module are used to demodulate the audio inter-carrier signal 110. In a particular embodiment, in the second mode of operation, the integrated circuit with the audio processor 106 is configured with frequency parameters based on the detected television audio standard.

To detect the television audio standard, the energy level detection module 304 compares an energy level of an intermediate frequency audio signal with respect to at least one frequency of a first audio standard, such as one of the audio standards illustrated in FIG. 2. The energy level detection module 304 also determines an energy level of the intermediate frequency audio signal, such as audio inter-carrier signal 110 with respect to at least one frequency of a second audio standard. The control logic 302 controls the energy level detection module 304 with respect to different frequencies of comparison. The different frequencies of comparison correspond to different frequency bands associated with detectable television audio standards. The energy level detection module 304 provides the amount of energy detected for each frequency band to the decision logic 306.

During operation, the energy level detection module 304 converts the audio inter-carrier signal 110 into a digital format using the analog to digital converter 309. The mixer 308 mixes the digital signal received from the analog to digital converter 309 and provides the mixed signal to the energy level module 310. The energy measurement module determines an energy level of the mixed signal received from the mixer 308. In a particular embodiment, the mixer 308 shifts a received audio signal based on a first selected reference frequency provided by the control module 302 to produce a frequency shifted audio signal. The energy measurement module 310 is responsive to the first mixer to measure an energy level of the frequency shifted audio signal. The measured energy level of the frequency shifted audio signal is provided to the decision logic 306.

The control logic 302 may iteratively provide different reference frequencies to the energy level detection module 304. The reference frequencies are associated with the frequency bands of a plurality of television audio standards. The energy level detection module 304 can therefore provide an energy measurement for each frequency band associated with a detectable television audio standard to the decision logic 306. In particular, during a first time period the energy level detection module 304 can determine an energy level of the audio inter-carrier signal 110 with respect to a frequency of a first audio standard. During a second time period, the energy level detection module 304 can determine an energy level of the audio inter-carrier signal 110 with respect to a frequency of a second audio standard. In this way, the energy level detection module can determine an energy level of the audio inter-carrier signal 110 with respect to a frequency of all detectable audio standards.

After receiving the measured energy levels from the detection module, the decision logic 306 determines which frequency bands of the audio inter-carrier signal 110 contain the most energy. Based on this determination, the decision logic 306 identifies a detectable television audio standard for the audio inter-carrier signal 110. In a particular embodiment the different detectable audio standards include the Broadcast Television Systems Committee (BTSC), EIA/J, NICAM L, NICAM D/K, NICAM I, NICAM B/G, M, A2 D/K (Type 1) A2 D/K (Type 2), A2 D/K (Type 3) and A2 B/G audio standards. In a particular embodiment, the different frequencies of comparison are between 4 and 7 MHz. In another particular embodiment, the frequencies of comparison include 4.5 MHz, 4.724216 MHz, 5.5 MHz, 5.7421875 MHz, 5.85 MHz, 6.0 MHz, 6.2578125 MHz, 6.5 MHz, and 6.7241875 MHz.

Figure 4:
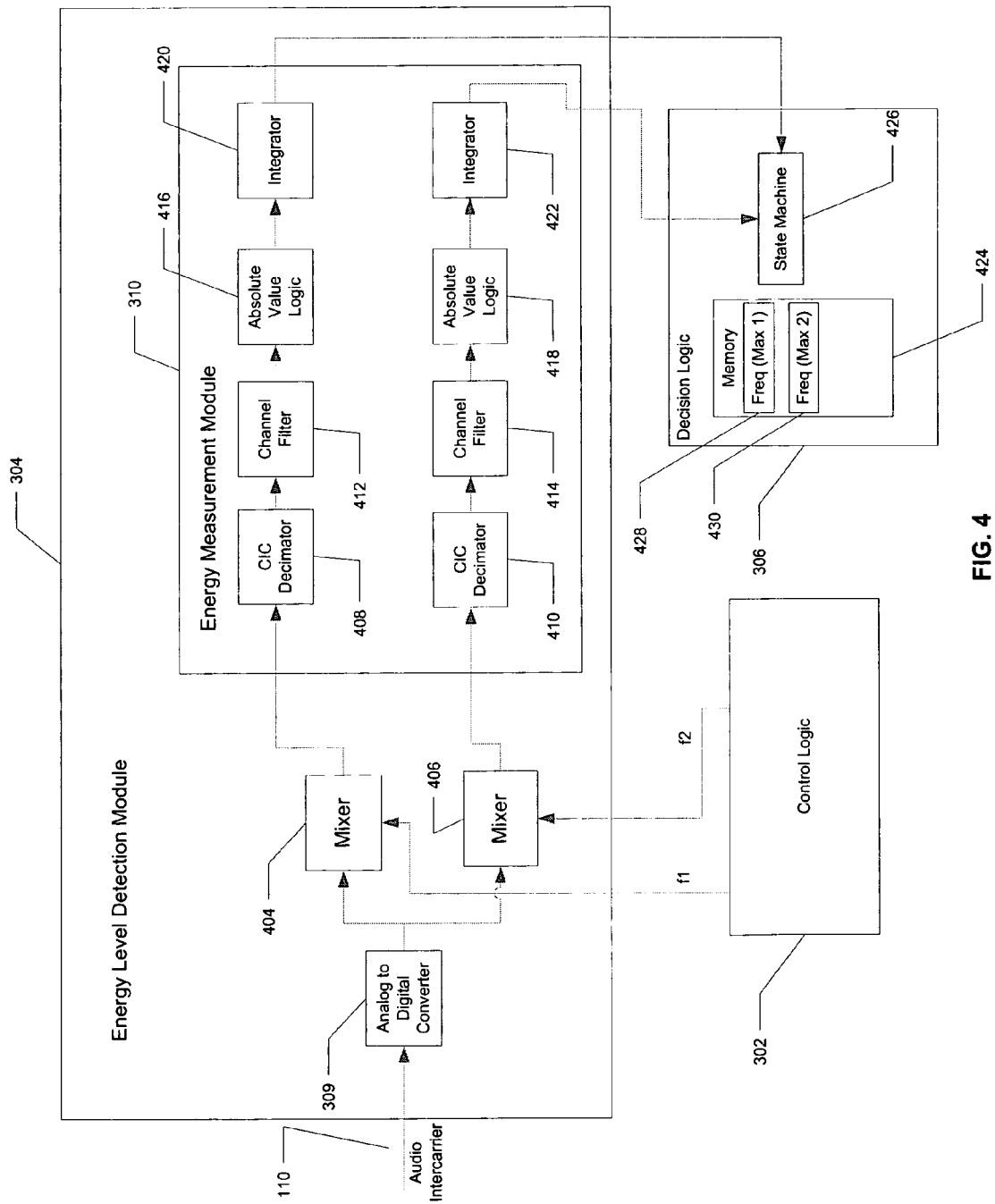
FIG. 4 is a block diagram illustrating exemplary portions of an audio processor of FIG. 3.

Referring to FIG. 4, exemplary portions of the audio processor of FIG. 3, such as the energy level detection module 304 illustrated in FIG. 3, is shown. The energy level detection module 304 includes an analog to digital converter 309, a first mixer 404, a second mixer 406, and an energy measurement module 310. The energy level detection module 304 is connected to control logic 302 and to decision logic 306. The decision logic 306 includes a state machine 426 and a memory 424. The memory 424 stores frequency information including a first maximum frequency 428, and a second maximum frequency 430. The energy measurement module 308 includes a first cascade integrator comb (CIC) decimator 408, a second CIC decimator 410, a first channel filter 412, a second channel filter 414, a first absolute value logic 416, a second absolute value logic 418, a first integrator 420, and a second integrator 422. As illustrated, the channel filter 412 is coupled to an output of the CIC decimator 408. The absolute value logic 416 is coupled to an output of the channel filter 412. The integrator 420 is coupled to an output of the absolute value logic 416. An output of the integrator 420 is provided to the state machine 426. The CIC decimator 410, channel filter 414, absolute value logic 418 and integrator 422 are configured in a similar fashion. Using this configuration, the energy measurement module 310 is able to measure the energy level of two different frequency bands of a received signal in parallel.

During operation, the first mixer 404 shifts the digital input signal based on an input frequency, labeled "$f_1$" in FIG. 4, to product a frequency shifted audio signal. The frequency shifted audio signal is provided to the energy measurement module 310 for energy measurement. The second mixer 406 shifts the digital audio signal based on a second selected reference frequency, labeled "$f_2$" in FIG. 4, to produce a second frequency shifted audio signal. The second frequency shifted audio signal is provided to the energy measurement module 310 to measure an energy level of the second frequency shifted audio signal.

As shown in FIG. 4, the decision logic 306 includes the memory 424. In a particular embodiment, the memory 424 stores frequency data associated with a plurality of detectable audio standards, such as the first frequency 428 and the second frequency 430. The control logic 302 iteratively provides a plurality of reference frequencies, such as "$f_1$" and "$f_2$" to the energy level detection module 304. The decision logic 306 receives measured energy levels of the audio inter-carrier signal 110 from the energy level detection module 304. The measured energy levels are provided to the state machine 426.

The state machine 426 determines the television audio standard based on each of the measured energy levels received from the energy measurement module 310. The state machine 426 stores a first received measured energy level in the memory 424 and stores the frequency associated with the measured energy level at the first maximum frequency 428. The state machine 426 stores the frequency associated with the measured energy level at the second maximum frequency 430. The state machine then compares each successive received measured energy level to the stored measured energy levels. If the received measured energy level is greater than the level associated with the first maximum frequency 428 or the second maximum frequency 430, the received measured energy level is stored and the first maximum frequency 428 or the second maximum frequency 430 is replaced. After all energy measurements have been received, the first maximum frequency 428 and the second maximum frequency 430 contain the frequencies associated with highest energy level and the second highest energy level of the plurality of reference frequencies. The state machine 426 then determines the television audio standard based the first maximum frequency 428 and the second maximum frequency 430. The state machine may also compare the stored measured energy levels to a threshold. The results of the comparison may also be used to determine the television audio standard. In addition, the second maximum frequency 430 may be compared to the first maximum frequency 428. If the results of the comparison indicate that the second maximum frequency 430 is small compared to the first maximum frequency 428, this may indicate that the audio standard associated with the digital input signal includes only one frequency band (e.g. the BTSC audio standard illustrated in FIG. 2).

Figure 5:
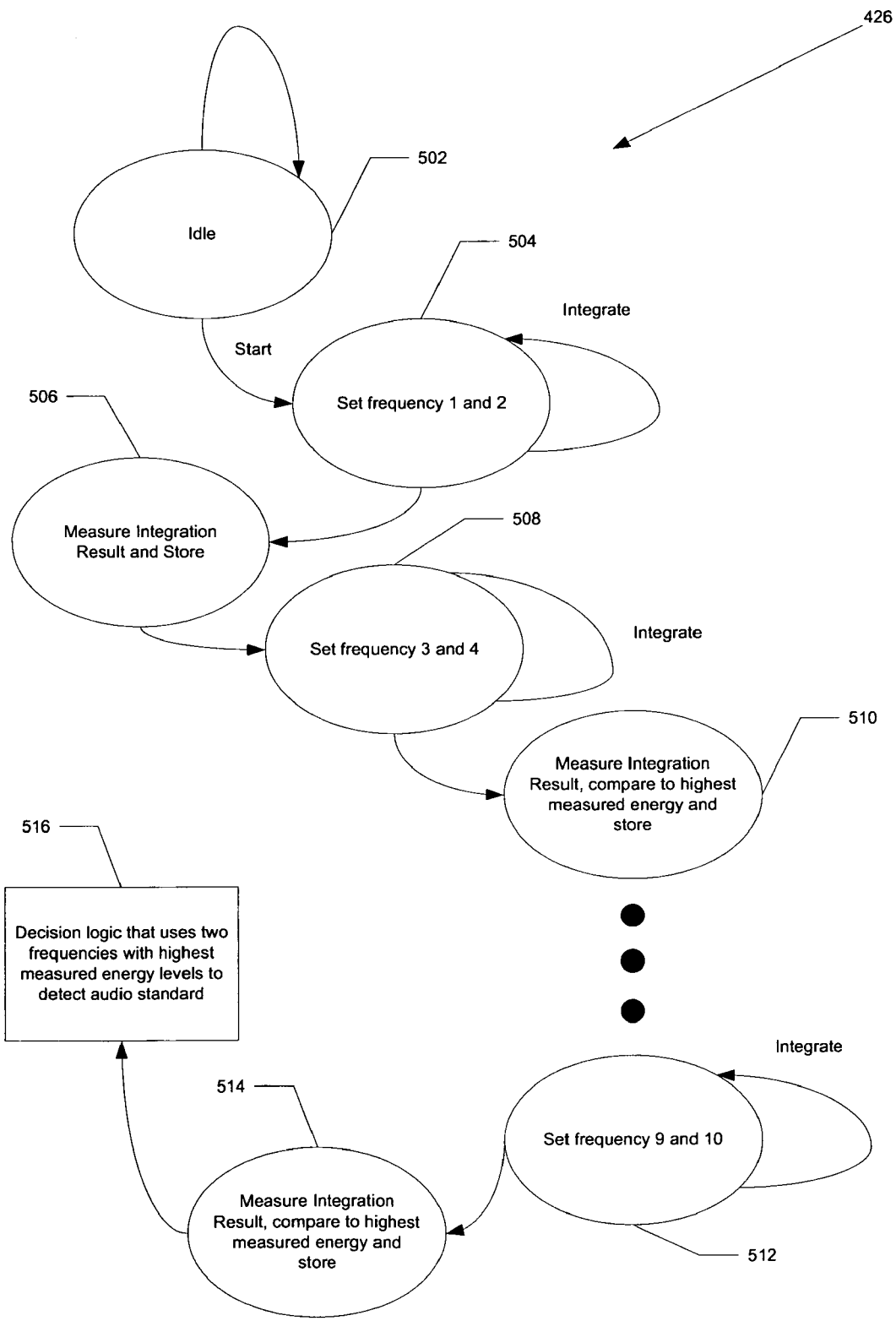
FIG. 5 is a diagram of an exemplary embodiment of a audio detection state machine for use in the audio processor of FIG. 4.

Referring to FIG. 5, an exemplary embodiment of the state machine of FIG. 4 is shown. In a first state 502 the state machine remains in an idle condition until the detection process is initiated. Moving to state 504 the state machine sets a first and second reference frequency for an energy level detection module. The state machine 426 remains in state 504 while an integration operation associated with the energy level detection module takes place. Moving to state 506, the state machine measures the integration result associated with the first and second reference frequencies and stores the results.

Proceeding to step 508, the state machine sets the reference frequencies for the energy measurement module to a third and fourth reference frequency. In a particular embodiment, the reference frequencies correspond to frequencies associated with a particular television audio standard. The state machine 426 remains in state 508 until completion of an integration operation. Proceeding to state 510 the state machine measures the integration result associated with the third and fourth reference frequencies and compares the result to the previously stored highest measured energy level. The highest measured energy level is then stored at state 510.

The state machine 426 continues to iteratively change the reference frequencies for the energy measurements and measures the integration results associated with those frequencies. The state machine then stores the frequency associated with the highest measured energy level and the second highest measured energy level.

Proceeding to state 512, the state machine sets the reference frequency to a ninth and a tenth reference frequency. The state machine 426 remains in state 512 until completion of an integration operation. In a particular embodiment, the integration operation is associated with the integration of a frequency shifted audio signal. Proceeding to step 514, the state machine measures the integration result, compares the integration result to the highest measured energy level and stores the highest measured energy level. The state machine then proceeds to state 516 and provides the frequencies associated with the highest measured energy level and the second highest measured energy level to decision logic. The decision logic uses the two frequencies with the highest measured energy levels to detect an audio standard. For example, if the state machine 426 indicates that the frequencies associated with the highest measured energy level and the second highest measured energy level were 5.5 MHz and 6 MHz respectively, the decision logic may determine that the audio standard associated with an audio input signal is the NICAM B/G standard. This can be understood with reference to FIG. 2, which shows that the frequency bands associated with the NICAM B/G standard include 5.5 MHz and 6 MHz.

Figure 6:
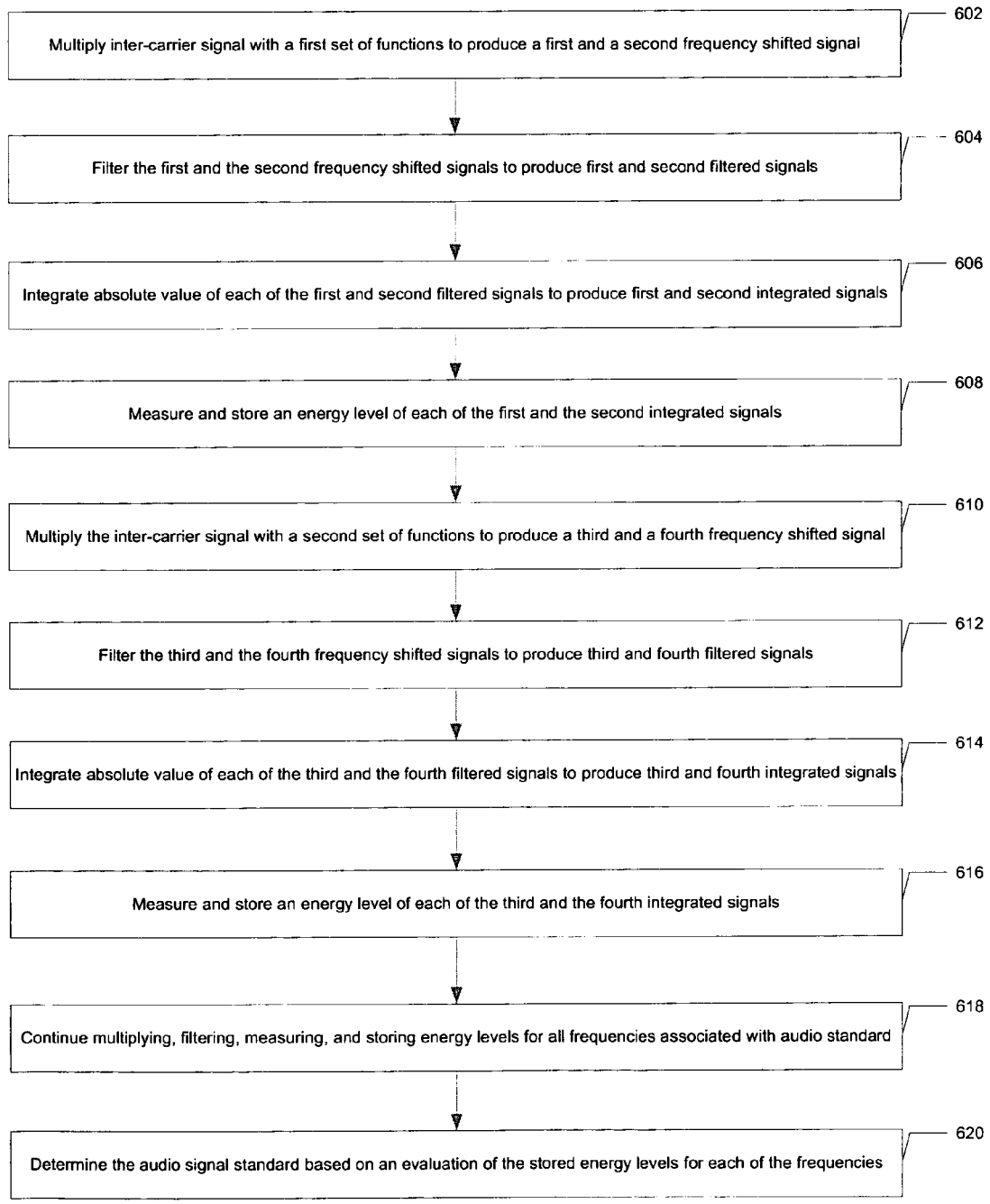
FIG. 6 is a flow chart of a method of detecting an audio standard.

Referring to FIG. 6, a method for determining an audio standard is illustrated. At step 602, an inter-carrier signal is multiplied with a first set of functions to produce a first and a second frequency shifted signal. In a particular embodiment, the functions are sinusoidal functions having selected frequencies. Proceeding to step 604, the first and second frequency shifted signals are filtered using a filter to produce first and second filtered signals. In a particular embodiment, the filter is a low pass filter. At step 606 the absolute value of each of the first and second filtered signals are integrated to produce first and second integrated signals. Proceeding to step 608, an energy level of each of the first and second integrated signals is measured and stored.

Moving to step 610, the inter-carrier signal is multiplied with a second set of functions to produce a third and a fourth frequency shifted signal. At step 612 the third and the fourth frequency shifted signals are filtered to produce third and fourth filtered signals. Proceeding to step 614, the absolute value of each of the third and fourth filtered signals are integrated to produce third and fourth integrated signals. Moving to step 616, an energy level of each of the third and fourth integrated signals are measured and stored. Proceeding to step 618, the multiplication, filtering, measuring and storing operations are performed for the frequencies associated with a variety of selected audio standards. Moving to step 620, the audio standard of a received signal is determined based on an evaluation of the stored energy levels.

Figure 7:
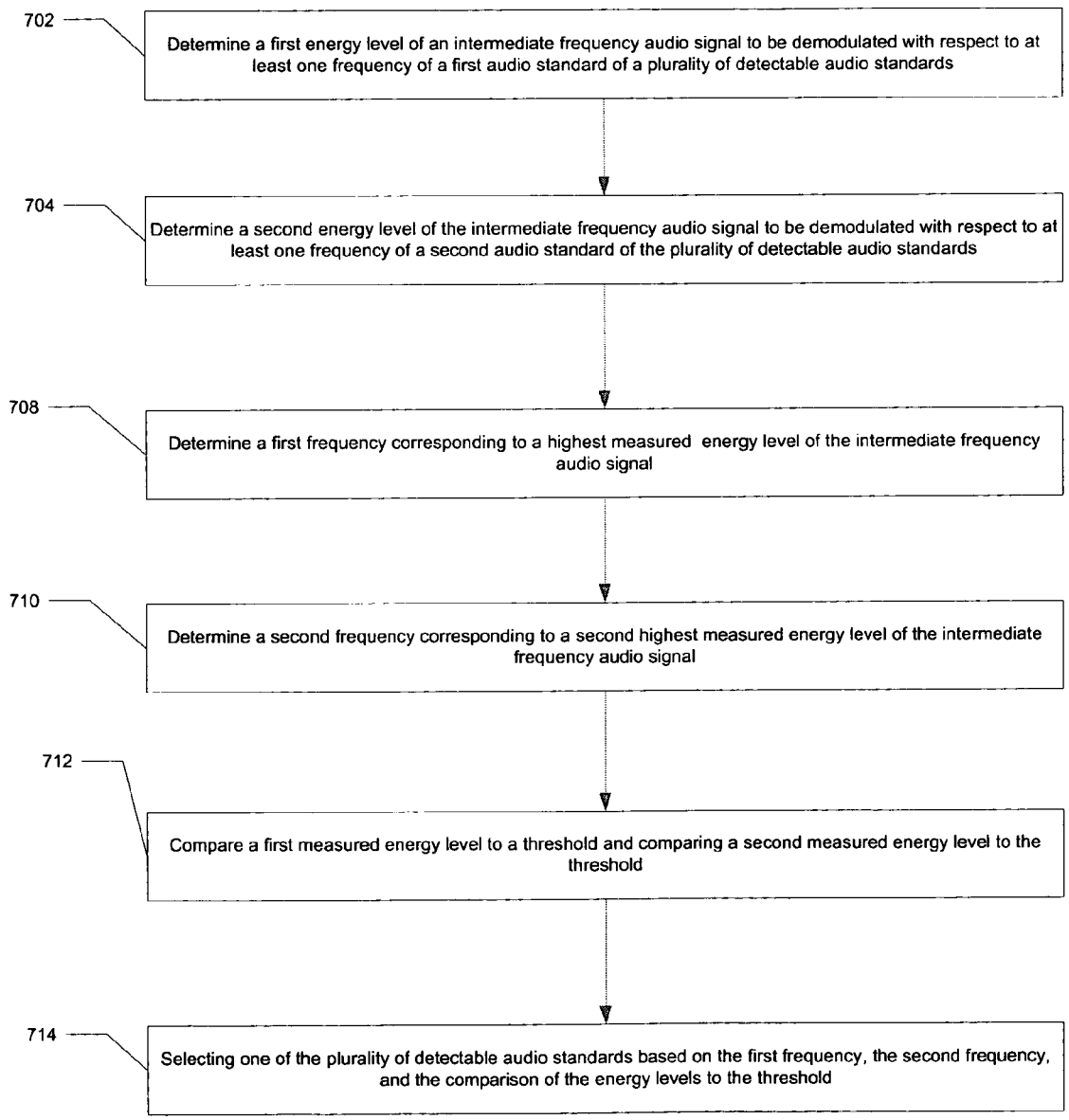
FIG. 7 is a flow chart of a method of determining energy levels to detect an audio standard.

Referring to FIG. 7, a method of detecting an audio signal communicated in accordance with an audio standard is illustrated. At step 702, a first energy level of an intermediate frequency audio signal to be demodulated with respect to at least one frequency of a first audio standard of a plurality of detectable audio standards is determined. In a particular embodiment, the intermediate frequency audio signal is a second intermediate frequency (SIF) audio signal. Proceeding to step 704, a second energy level of the intermediate frequency audio signal to be modulated with respect to at least one frequency of a second audio standard is determined. Moving to step 708, the first frequency corresponding to a highest measured energy level of an intermediate frequency audio signal is determined. At step 710, a second frequency corresponding to a second highest measured energy level of an intermediate frequency audio signal is determined. Proceeding to step 712, a first measured energy level is compared to a threshold and a second measured energy level is compared to the same threshold.

Proceeding to step 714, one of the plurality of detectable audio standards is selected based on the first frequency, the second frequency, and the comparison of the energy levels to the threshold. The threshold may be used to determine whether the audio signal is associated with a television audio standard that incorporates only one frequency band. For example, referring to FIG. 2, the EIA/J audio standard is associated with a frequency band centered at about 4.5 MHz, while the M standard is associated with two frequency bands centered at about 4.5 MHz and 4.7 MHz. By comparing the energy levels to a threshold, the method can determine whether the audio signal is associated with the EIA/J standard or the M standard. For example, if a comparison indicates that the energy level associated with the 4.7 MHz frequency band is less than the threshold, it is more likely that the audio input signal is associated with the EIA/J standard than the M standard. In a particular embodiment, the threshold is approximately half of the second highest measured energy level.

The method may allow for faster, and more uniform, audio standard detection time. In a particular embodiment, the time to select one of the plurality of audio standards is less than 13 milliseconds. In another particular embodiment, the time to select one of the plurality of audio standards is substantially fixed regardless of which one of the plurality of audio standards is selected.

In a particular embodiment, after an audio standard is selected, an audio standard detection module, such as the audio standard detection module 300 illustrated in FIG. 3, is configured based on the selected audio standard. For example, if the audio standard detection module includes filter modules, such as channel filters 414 and 412 illustrated in FIG. 4, the filter characteristics of the filter modules may be changed depending on the selected audio standard. This allows the audio signal to be processed based on the detected audio standard before it is provided to a television speaker or other device.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An integrated circuit, comprising:
    an input to receive a signal; and
    an audio processor coupled to the input, the audio processor including an audio standard detection module to detect in less than 13 milliseconds a characteristic of the received signal that identifies a television audio standard by measuring an energy level of a plurality of different frequency bands of the received signal.

2. The integrated circuit of claim 1, wherein the audio standard detection module has a first mode of operation and a second mode of operation, wherein in the first mode of operation the audio standard detection module is operable to detect the television audio standard, and in the second mode of operation the audio standard detection module is operable to demodulate the received signal.

3. The integrated circuit of claim 2, wherein in the second mode of operation, the audio processor is configured base on frequency parameters of the the detected television audio standard.

4. The integrated circuit of claim 2 wherein the audio processor includes a channel filter to perform noise reduction of the received signal.

5. The integrated circuit of claim 2, wherein the television audio standard includes at least one of a Broadcast Television Systems Committee (BTSC) standard, an Electronic Industries Alliance/J (EIA/J) standard, a Near Instantaneous Companded Audio Multiplex L (NICAM L) standard, a NICAM D/K standard, a NICAM I standard, a NICAM B/G, M standard, an A2 D/K (Type 1) standard, an A2 D/K (Type 2) standard, an A2 D/K (Type 3) standard, an A2 B/G standard.

6. The integrated circuit of claim 2, wherein a frequency of the signal is between 4 and 7 Megahertz.

7. An audio standard detection module, comprising:
    an input to receive an audio signal;
    a first mixer coupled to the input to frequency shift the audio signal based on a first selected reference frequency to output a first frequency shifted audio signal;
    an energy measurement module responsive to the first mixer to measure a first energy level of the frequency shifted audio signal, the energy measurement module including logic to determine an absolute value based on the output of the first mixer; and
    decision logic to determine an audio standard for the audio signal based on an output of the energy measurement module.

8. The audio standard detection module of claim 7, wherein the energy measurement module includes an integrator.

9. The audio standard detection module of claim 7, wherein the energy measurement module includes a Cascaded Integrator-Comb (CIC) decimator.

10. The audio standard detection module of claim 7, wherein the energy measurement module includes a channel filter.

11. The audio standard detection module of claim 7, further comprising:
    a second mixer coupled to the first input to frequency shift the audio signal based on a second selected reference frequency to produce a second frequency shifted audio signal.

12. The audio standard detection module of claim 11, further comprising:
    a second energy measurement module responsive to the second mixer to measure a second energy level of the second frequency shifted audio signal.

13. The audio standard detection module of claim 11, wherein the audio signal is an intermediate frequency audio signal.

14. The audio standard detection module of claim 11, wherein the audio signal is derived from a signal received via a television tuner.

15. An audio standard decision module, comprising:
    an output to provide a plurality of reference frequencies to an energy detection module;
    an input to receive a plurality, of measured energy levels corresponding to an input signal from the energy detection module, the plurality of measured energy levels corresponding to the plurality of reference frequencies; and decision logic to determine a television audio standard based on the plurality of measured energy levels and based on the plurality of reference frequencies, the decision logic including a state machine, wherein the state machine includes a first state to provide a first reference frequency and to wait for a first energy measurement and a second state to store the first reference frequency.

16. The audio standard decision module of claim 15, wherein the state machine further includes a third state to provide a second reference frequency and to wait for a second energy measurement and a fourth state to replace the stored first reference frequency with the second frequency in response to a determination that the second energy measurement is greater than the first energy measurement.

17. A method of processing a received signal to determine an audio signal standard, the method comprising:
    multiplying an inter-carrier signal with a first set of functions to produce a first and a second frequency shifted signal;
    filtering the first and the second frequency shifted signals to produce first and second filtered signals;
    integrating the absolute value of each of the first and second filtered signals to produce first and second integrated signals;
    measuring and storing an energy level of each of the first and the second integrated signals;
    multiplying the inter-carrier signal with a second set of functions to produce a third and a fourth frequency shifted signal;
    filtering the third and the fourth frequency shifted signals to produce third and fourth filtered signals;
    integrating the absolute value of each of the third and the fourth filtered signals to produce third and fourth integrated signals;
    measuring and storing an energy level of each of the third and the fourth integrated signals; and
    selecting the audio signal standard in less than 13 milliseconds based on an evaluation of the stored energy levels.

18. The method of claim 17, further comprising:
    multiplying an inter-carrier signal with a third set of functions to produce a fifth and a sixth frequency shifted signal;
    filtering the fifth and the sixth frequency shifted signals to produce fifth and sixth filtered signals;
    integrating the absolute value of each of the fifth and sixth filtered signals to produce fifth and sixth integrated signals;
    measuring and storing an energy level of each of the fifth and the sixth integrated signals;
    multiplying the inter-carrier signal with a fourth set of functions to produce a seventh and an eighth frequency shifted signal;
    filtering the seventh and the eighth frequency shifted signals to produce seventh and eighth filtered signals;
    integrating the absolute value of each of the seventh and the eighth filtered signals to produce seventh and eighth integrated signals;
    measuring and storing an energy level of each of the seventh and the eighth integrated signals;
    multiplying an inter-carrier signal with a fifth set of functions to produce a ninth and a tenth frequency shifted signal;
    filtering the ninth and the tenth frequency shifted signals to produce ninth and tenth filtered signals;
    integrating the absolute value of each of the ninth and the tenth filtered signals to produce ninth and tenth integrated signals; and
    measuring and storing an energy level of each of the ninth and the tenth integrated signals.

19. The method of claim 17, wherein the first set of functions are sinusoidal functions.

20. The method of claim 17, wherein the filtering is performed by a low pass filter.

21. A method of detecting an audio signal communicated in accordance with an audio standard, the method comprising:
    determining a first energy level of an intermediate frequency audio signal to be demodulated with respect to at least one frequency of a first audio standard of a plurality of detectable audio standards;
    determining a second energy level of the intermediate frequency audio signal to be demodulated with respect to at least one frequency of a second audio standard of the plurality of detectable audio standards; and
    selecting one of the plurality of detectable audio standards based on the first and second determined energy levels in less than 13 milliseconds.

22. The method of claim 21, further comprising demodulating the intermediate frequency audio signal using a frequency set associated with the selected one of the plurality of audio standards.

23. The method of claim 21, wherein the intermediate frequency audio signal is a second intermediate frequency (SIF) audio signal.

24. The method of claim 21, wherein the time to select one of the plurality of audio standards is substantially fixed regardless of which one of the plurality of audio standards is selected.

25. The method of claim 21, further comprising:
    configuring a audio standard detection module based on a selected audio standard.

26. The method of claim 21, further comprising:
    determining a first frequency corresponding to a highest measured energy level of a plurality of frequency shifted signals derived from the intermediate frequency audio signal;
    determining a second frequency corresponding to a second highest measured energy level of the plurality of frequency shifted signals derived from intermediate frequency audio signal; and
    wherein the one of the plurality of detectable audio standards is selected based on the first and the second frequency.

27. The method of claim 26, further comprising:
    comparing a first measured energy level to a threshold and comparing a second measured energy level to the threshold.

28. The method of claim 27, wherein the threshold is approximately half of the second highest measured energy level.

* * * * *